July 4, 1933.   J. H. HUNT   1,917,034
DEMOUNTABLE SPOKED WHEEL

Filed April 7, 1928

INVENTOR.
J. HAROLD HUNT
BY John P. Tarbox
ATTORNEY.

Patented July 4, 1933

1,917,034

UNITED STATES PATENT OFFICE

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA

DEMOUNTABLE SPOKED WHEEL

Application filed April 7, 1928. Serial No. 268,340.

The principal object of the invention of this interchangeable wheel is the attainment of a mounting for wood spoked wheels which will render them interchangeable with disc and wire wheels, and at the same time, involve a very minimum of metal at the center of the wheel. Ancillary objects are the general strengthening of the inter-connection of the spoke ends so that when demounted, they are solidly held together, the provision for the offsetting of the plane of the spokes with respect to the radial hub flange common in disc wheel attachment whereby the plane of tread may be properly adjusted, and an efficient provision for the seating of the nuts by which such wheels are secured in place.

These objects I attain by carrying the inner ends of the spokes inwardly of the outer periphery of the flange a distance sufficient to permit the attachment means, the studs and nuts, to engage the wheel body through the inner ends of the spokes, and at the same time, cutting away the inner ends of these spokes axially in part so as to adjust the offset and the plane of tread. Metallic facing and attaching plates complemental to the cut away and non-cut-away faces of the spokes are clamped upon the spokes by means of rivets or bolts and solidly bind them together. The attaching plate complemental to the cut away portion I configure to provide suitable attaching seats to co-act with the radial flange of the hub. The attaching plate complemental to the non-cut-away face I provide with nut receiving sockets complemental to the working faces of the nuts.

The wheel is shown in the accompanying drawing.

Figure 1:
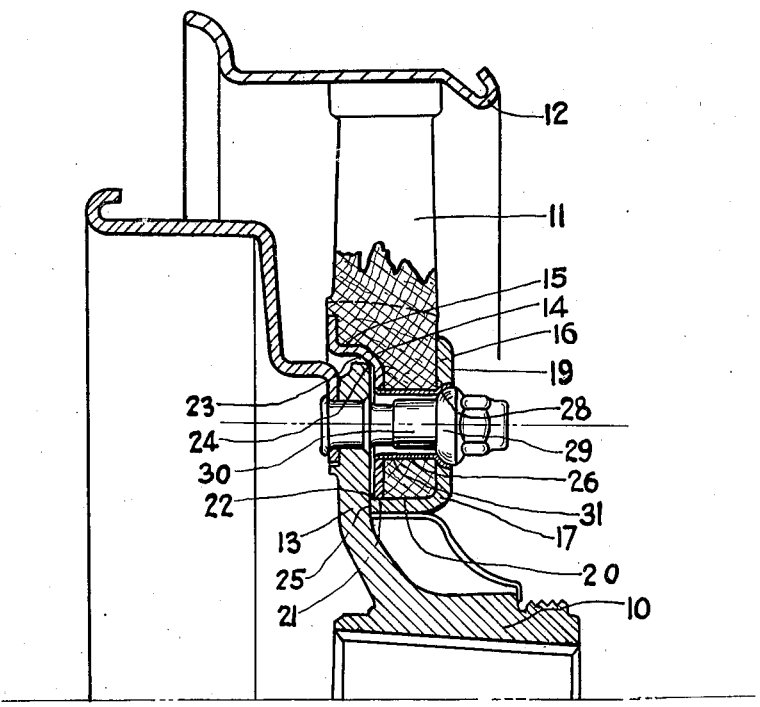
Figure 1 is a section of one half of the wheel in the axial plane.
Figure 2:
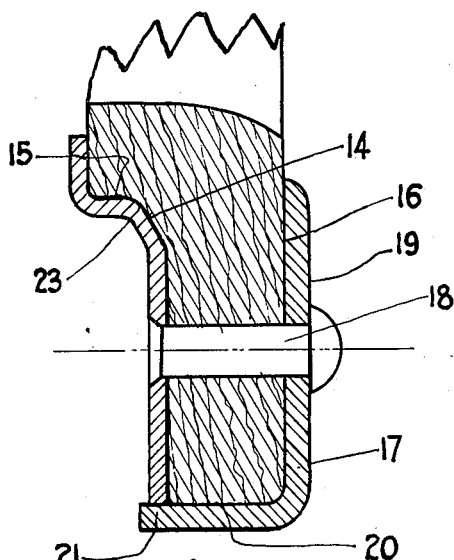
Figure 2 is a similar section of a detail.

10 is the hub. 11 are the spokes. 12 is the rim. Except for the inner ends of the spokes and the attaching devices these elements are all of commonly known construction. But the inner ends of the spokes are cut away axially inwardly of the wheel in such manner that the main bodies of the spokes are inwardly offset as respects the radial flange 13 of the hub. This cut away section is designated 14. Complemental to it is provided an inner attaching plate 15 and complemental to the outer face 16 of the spokes, which is in this embodiment not cut away to any extent, is an outer attaching plate. This plate and the plate 15 are solidly clamped to each other by means of through rivets 18 as indicated in a detail of Fig. 2. The plate 17, moreover, is of angle cross section, the outer arm 19 bearing on the face 16 of the spokes and the inner arm 20 bearing on the inner terminal circle of the spoke ends and extending axially inwardly into contact with and beyond the inner periphery 21 of the inner annular attaching plate 15. The inner periphery 21 of the plate 15 is welded at 22 to the inner surface of the inner arm 20 of the plate 17. The two plates thus provide a channel cross section into which the spoke ends are received.

A bend 23 in the outer portion of the plate 15 provides a seat 24 against the outer periphery of the flange 13, while the inwardly extended edge of the arm 20 provides an inner annular seat 25 radially spaced from the seat 24. Intermediate these seats 24 and 25 the members 15 and 16 are provided with bolt holes 26 in registry and passing through the wood of the spokes. These receive projecting freely through them the securing studs 27 which are fixedly anchored in the flanges 13. The margins of the holes passing through member 17 are spherically faced as at 28. The spherically faced nuts 29 engage faces 28. These nuts are provided with elongated inward extensions or aprons 30 through which the nuts are threaded upon studs 27.

A ferrule 31 passed through each hole 26 has its opposite ends turned over and its outer end spherically coined complemental to faces 28—29 whereby the ferrule not only joins the plates 15 and 17 but also provides a seat for the nut.

The hub 10, flange 13, and studs 27 are the hub parts upon which the standard Budd Michelin disc wheel is mounted. The studs have the same spacing, same size and same length as in the instance of the disc wheel mounting. The seats 24, 25, provided through the construction of my invention, are essentially similar to the seats provided in the inner portion of a disc wheel. This rigid spoked wheel, therefore, fits identically in the place of the disc wheel. And since, according to my invention, I provide extensions 30 on the nuts, my new rigid spoked wheel may be effectually secured in place to the same studs 27 as is the disc wheel. The extensions 30 do not contact with the walls of the holes 26 and the well-known interaction between the spherical surfaces 28—29 is therefore unimpaired in any way.

The sturdy construction, the ready adjustment of the plane of tread and the complete interchangeability are quite apparent.

Each and all modifications of my invention which fall within its generic spirit are to be comprehended within the scope of the annexed claims.

What I claim as new and useful is:

1. A rigid spoked wheel comprising spokes having their inner ends axially inwardly recessed to form a seating face for attachment to a radial hub flange and provided with radially spaced annular seats adapted to form mounting seats for said wheel on said hub flange.

2. A rigid spoked wheel body having its radially inner portion axially inwardly recessed for attachment to a radial hub flange, and inner and outer radially extending attaching plates encompassing said recessed portion, the outer of which has an axial extension through the hub hole of the wheel body, the inner of which is complemental to said recessed portion, and annular seats respectively constituted by outer and inner portions of the respective plates for mounting of the wheel body on the hub flange.

3. A rigid spoked wheel body including a radially inner portion having an axially inwardly recessed portion forming a seating face for attachment to a radial hub flange and provided with radially spaced annular mounting seats arranged for engaging said wheel body on said hub flange.

In testimony whereof he hereunto affixes his signature.

J. HAROLD HUNT.